(12) United States Patent
Siefker (10) Patent No.: US 6,267,327 B1
(45) Date of Patent: Jul. 31, 2001

(54) COUPLING SYSTEM FOR CONNECTING A GAS TURBINE ENGINE TO AN AIRCRAFT MOUNTED EXHAUST SYSTEM

(75) Inventor: Robert G. Siefker, Greenwood, IN (US)

(73) Assignee: Allison Advanced Development Company, Indianapolis, IN (US)

(*) Notice: Subject to any disclaimer, the term of this patent is extended or adjusted under 35 U.S.C. 154(b) by 0 days.

(21) Appl. No.: 09/285,547

(22) Filed: Apr. 2, 1999

(51) Int. Cl.[7] .............................. B64D 29/06; B64D 33/04
(52) U.S. Cl. ........................ 244/53 R; 244/54; 244/131
(58) Field of Search .................... 244/131, 53 R, 244/54, 110 B; 285/374, 24, 304, 407, 409; 60/322, 323, 39.31, 226.1; 248/554; 181/213, 215, 216, 212

(56) References Cited

U.S. PATENT DOCUMENTS

| | | |
|---|---|---|
| 2,809,057 * | 10/1957 | McEachern ........................... 285/374 |
| 3,327,971 * | 6/1967 | Stewart et al. ......................... 244/54 |
| 3,831,888 * | 8/1974 | Baker et al. ............................ 244/54 |
| 4,013,246 | 3/1977 | Nightingale . |
| 4,037,809 * | 7/1977 | Legrand ................................. 244/54 |
| 4,192,142 | 3/1980 | Häegele . |
| 4,369,937 * | 1/1983 | LeBell et al. ........................... 244/54 |
| 4,593,526 | 6/1986 | Pankowiecki . |
| 4,805,851 * | 2/1989 | Herbst .................................... 244/54 |
| 5,088,775 * | 2/1992 | Corsmeier et al. ................... 285/374 |
| 5,190,245 | 3/1993 | Debeneix . |
| 5,390,878 | 2/1995 | Padden . |
| 5,406,791 | 4/1995 | Bauer . |
| 5,447,282 * | 9/1995 | Durand .................................. 244/54 |

* cited by examiner

Primary Examiner—Galen L. Barefoot
(74) Attorney, Agent, or Firm—Woodard, Emhardt, Naughton, Moriarty & McNett (57) ABSTRACT

The present invention contemplates a mechanical coupling for connecting a gas turbine engine to an aircraft mounted exhaust system. In one embodiment, the coupling includes a collar mounted to the gas turbine engine proximate the gas turbine engine's outlet. The collar having a pair of spaced elongated recesses formed therein. An inner surface of the exhaust system includes a pair of pins extending into the pair of spaced elongated recesses. The inter-engagement of the pins and recesses connect the gas turbine engine with the exhaust system. The pins being moveable within the recesses in response to movement by the gas turbine engine.

25 Claims, 6 Drawing Sheets

COUPLING SYSTEM FOR CONNECTING A GAS TURBINE ENGINE TO AN AIRCRAFT MOUNTED EXHAUST SYSTEM

BACKGROUND OF THE INVENTION

The present invention relates in general to the field of mechanical devices for connecting an aircraft mounted exhaust system to a gas turbine engine. More particularly, one embodiment of the present invention defines a coupling having pins extending from the exhaust system that are received within recesses formed in a collar mounted to the gas turbine engine to allow relative movement between the components while maintaining the gas turbine engine connected to the aircraft mounted exhaust system. Although the coupling system was developed for an aircraft mounted exhaust system, certain applications may be outside of this field.

It is well known that a gas turbine engine is often utilized to provide the motive force for propelling the aircraft through the air. Generally, the gas turbine engine is attached to a portion of the aircraft structure, such as the wing or nacelle structure. In some aircraft designs, the gas turbine engine is mounted to the aircraft structure so as to allow relative motion in several planes including side-to-side, up-and-down, front-to-rear, and some combination of the three. Often, the movement in one of the possible planes of motion is quite severe while the movement in the other planes of motion is limited. For example, the T56-A15 engine manufactured by Rolls Royce Allison of Indianapolis, Ind. and utilized on the Lockheed C-130 Aircraft is securely mounted by two stout rubber mounts at the forward end of the engine and one mount at the top rear of the engine. This mounting configuration allows the rear of the engine to move laterally several inches while its front-to-rear and up-and-down motion is inhibited by the mounting structure to a fraction of an inch. In the Lockheed C-130 Aircraft, the exhaust system is relatively lightweight and mounted directly to the engine and allowed to move with the engine.

In certain aircraft designs, the exhaust system is heavier than the gas turbine engine can support under dynamic conditions. A generally accepted design practice is to support a significant portion of the weight and dynamic load of the exhaust system from the aircraft wing or nacelle structure. In these designs, it is desirable that a mechanical device connects between the gas turbine engine and the exhaust system to allow for substantial motion between the engine and exhaust system in one dimension while limiting the amount of motion in the other dimensions. One prior art-coupling scheme consists of a complex system of overlapping seals and springs that are coupled to the gas turbine engine and the exhaust duct with mounting rings. The overlapping seals allow motion in up-and-down and side-to-side directions by the slippage of the seals on each other. Front-to-back motion is accommodated by the springs as the unit expands and contracts with the relative motion.

Heretofore, there has been a need for a coupling for connecting a gas turbine engine to an aircraft mounted exhaust system. The present invention satisfies this need in a novel and unobvious way.

SUMMARY OF THE INVENTION

One form of the present invention contemplates a coupling device adapted for connecting an aircraft mounted exhaust system to a gas turbine engine.

Another form of the present invention contemplates a combination comprising, a coupler with two pins riding in recesses at the top portion and bottom portion of a gas turbine engine proximate a rear engine flange. The coupler supports a forward portion of an exhaust system, and the two pins can slide within the recesses to permit relative movement between the components.

One aspect of the present invention contemplates a combination, comprising: an aircraft; a gas turbine engine coupled to the aircraft; the gas turbine engine having an outlet for the passage of exhaust gas; an exhaust member in fluid communication with the outlet and adapted for receiving at least a portion of the exhaust gas from the outlet; and a coupling connecting the exhaust member with the gas turbine engine, the coupling having a first portion extending from and fastened to one of the exhaust member and the gas turbine engine and a second receiving portion on the other of the exhaust member and the gas turbine engine for receiving the first portion therein and allowing relative movement between the portions.

One object of the present invention is to provide a unique coupling connecting the gas turbine engine to an aircraft mounted exhaust system.

Related objects and advantages of the present invention will be apparent from the following description.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
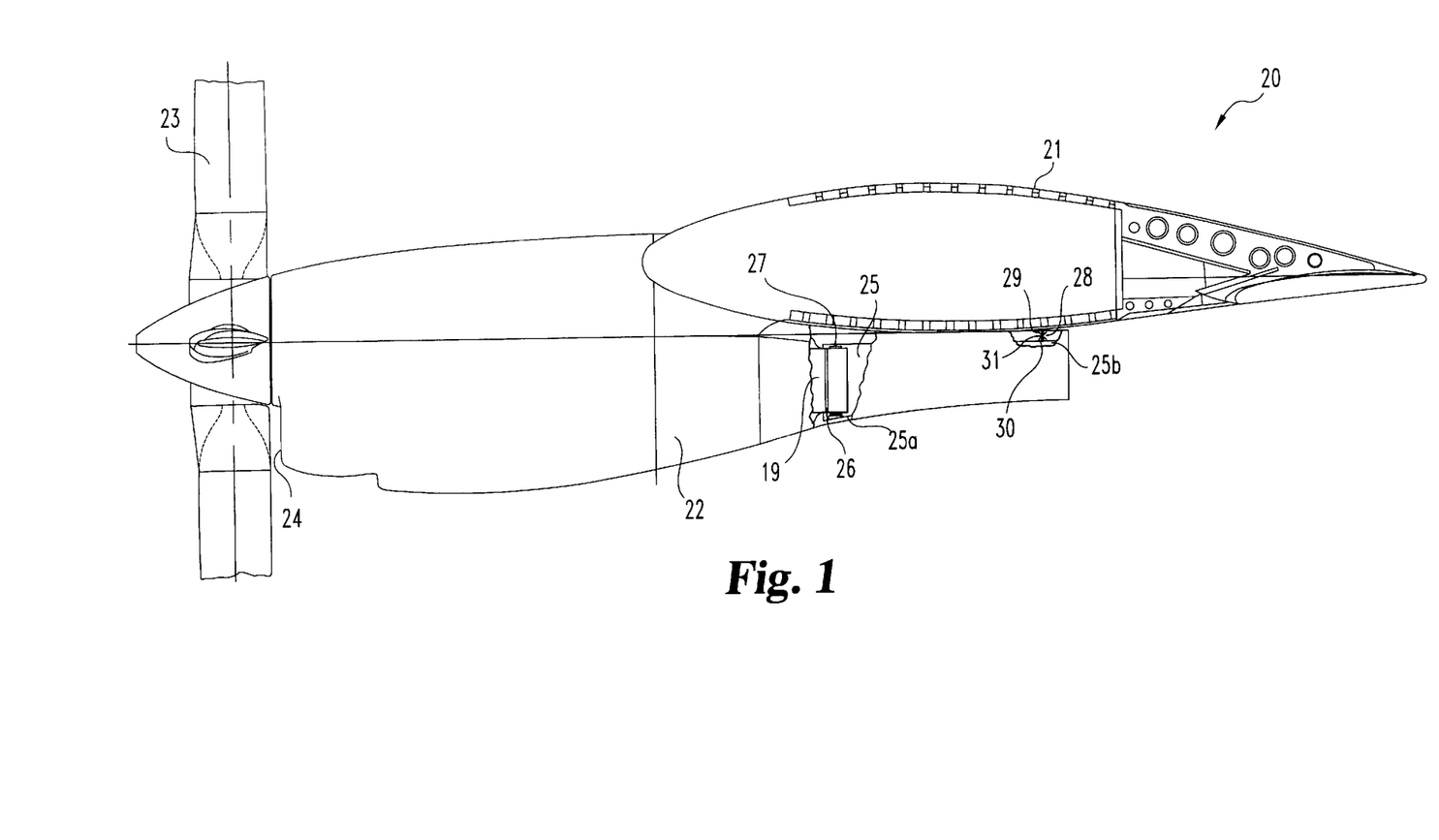
FIG. 1 is a partially fragmented view of a portion of an aircraft having one embodiment of the present invention for connecting an exhaust system with a gas turbine engine.

With reference to FIG. 1, there is illustrated a portion 20 of an aircraft including a left wing 21 and a nacelle 22 which includes a propeller 23 powered by a gas turbine engine 19. The gas turbine engine 19 includes a compressor, a combustor and a turbine that have been integrated together to produce the power to turn the propeller 23. It is important to realize that here are a multitude of ways in which the gas turbine components can be linked together. Additional compressors and turbines could be added with intercoolers connecting between the compressors and reheat combustion chambers could be added between the turbines. An inlet duct 24 allows air into the gas turbine engine 19 and an exhaust system 25 discharges the lost gas flow from the gas turbine engine outlet to the atmosphere.

The illustration in FIG. 1 is not intended to limit an aircraft to the specific structure illustrated, as the present invention is believed compatible with most aircraft structures. A person skilled in the art will appreciate that an aircraft includes a fuselage with a pair of wings extending therefrom, a cockpit, and a tail. Further, while the aircraft has been illustrated with a nacelle 22 it is contemplated that certain aircraft designs may not include a nacelle. Gas turbine engine 19 is coupled to the aircraft structure by a plurality of engine mounts. In one embodiment the engine mounts allow the gas turbine engine 19 to move relative to the aircraft structure.

The gas turbine engine has a rear-mounting flange 26 located at the outlet of the gas turbine engine 19. A coupling device 27 connects the exhaust system 25 with the gas turbine engine 19. The coupling device 27 connecting and supporting an inlet end 25a of the exhaust system 25. Coupling device 27 is formed of materials that can withstand the high temperature environment associated with the exhaust gases from the gas turbine engine 19; materials such as titanium, and high temperature nickel alloy steels. The exhaust system has an outlet end 25b that is supported by a rear support 28 that bears a portion of the weight of the exhaust system 25. Rear support 28 has an aircraft attachment portion 29 attached to the aircraft structure and an exhaust attachment portion 30 attached to the exhaust system 25 with a mechanical link 31 therebetween. In one embodiment a rod that can pivot between the attachment portions defines mechanical link 31. Further, an aerodynamic cover 32 is normally connected to the aircraft and is positioned over the exhaust system 25. In an effort to aid the reader portions of the cover has been removed to show the relationship between the coupling device 27, the exhaust system 25, the aircraft and the gas turbine engine 19.

Figure 2:
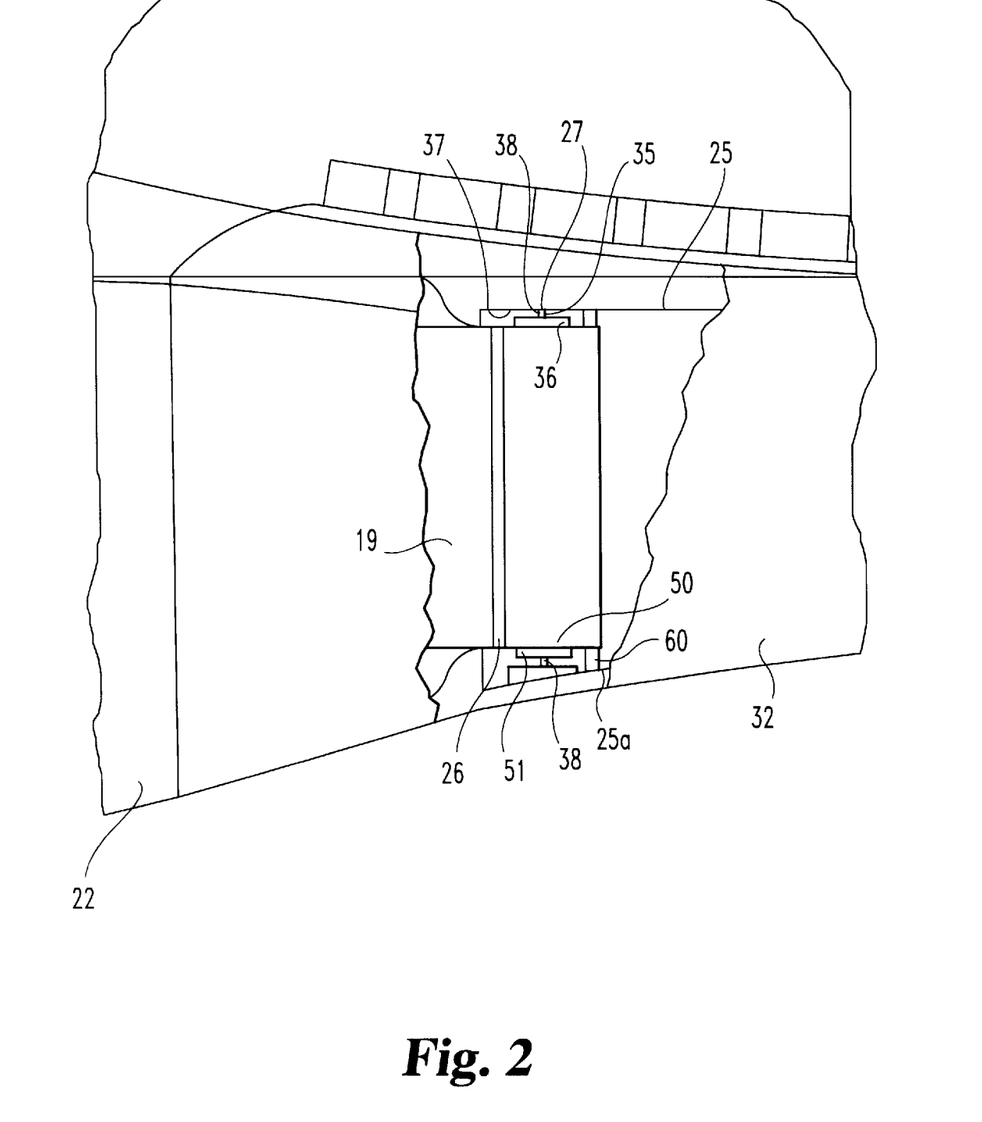
FIG. 2 is an enlarged view of the coupling device comprising a portion of FIG. 1.

With reference to FIG. 2, there is illustrated an enlarged view of the coupling device 27 connecting the inlet end 25a of the exhaust system 25 to the gas turbine engine 19 proximate the rear mounting flange 26. The exhaust system 25 illustrated in the figures is not intended to be limiting herein, and it is understood that the coupling device 27 can connect other exhaust system designs with a gas turbine engine. The term exhaust system is intended to have a broad meaning that will include any type of member coupled to the outlet of the gas turbine engine for receiving at least a portion of the gas exiting the engine. The exhaust system may be a single piece structure, multiple piece structure, include sound suppressors, mufflers, radiation suppressors, ejectors, mixers, ejector mixer combinations, simple and/or serpentine dusts, and the like.

The coupling device 27 includes an extending portion 35 that is received within a receiving portion 36. One form of the present invention includes a seal 60 positioned within the exhaust system 25 to minimize the leakage of fluid past coupling 27 and out the inlet end 25a of the exhaust system 25. However, other forms of the present invention do not include the seal 60. In one embodiment the coupling device 27 is located substantially within the inlet end 25a of the exhaust system 25. More particularly, the extending portion 35 is coupled to an inner surface 37 of the exhaust system 25 and the receiving portion 36 is coupled to a portion of the gas turbine engine 19 proximate the rear mounting flange 26. However, in an alternate embodiment the receiving portion is coupled to the exhaust system 25 and the extending portion is coupled to the gas turbine engine. In a preferred embodiment pins 38 that are fixedly connected to the exhaust system 25 define the extending portion 25. The pins 38 extend radially inward to the receiving portion 36 and, in one embodiment, are spaced about one hundred and eighty degrees apart at the relative top and bottom of the gas turbine engine outlet. However, it is contemplated in an alternative embodiment that the extending portion is a member having other shapes, such as but not limited to oval pins, spherical balls, and multiple spherical balls.

In one embodiment the receiving portion 36 is defined on a collar 50 that is mounted solidly to the gas turbine engine 19. The collar 50, in a more preferred embodiment, includes a boss portion 51 that has the receiving portion 36 formed therein. However, collars without a boss portion are contemplated in alternate embodiments. It should be understood herein that the receiving portion 36 could be formed directly on surfaces of the gas turbine engine and/or formed on collars mounted to the gas turbine engine.

Figure 3:
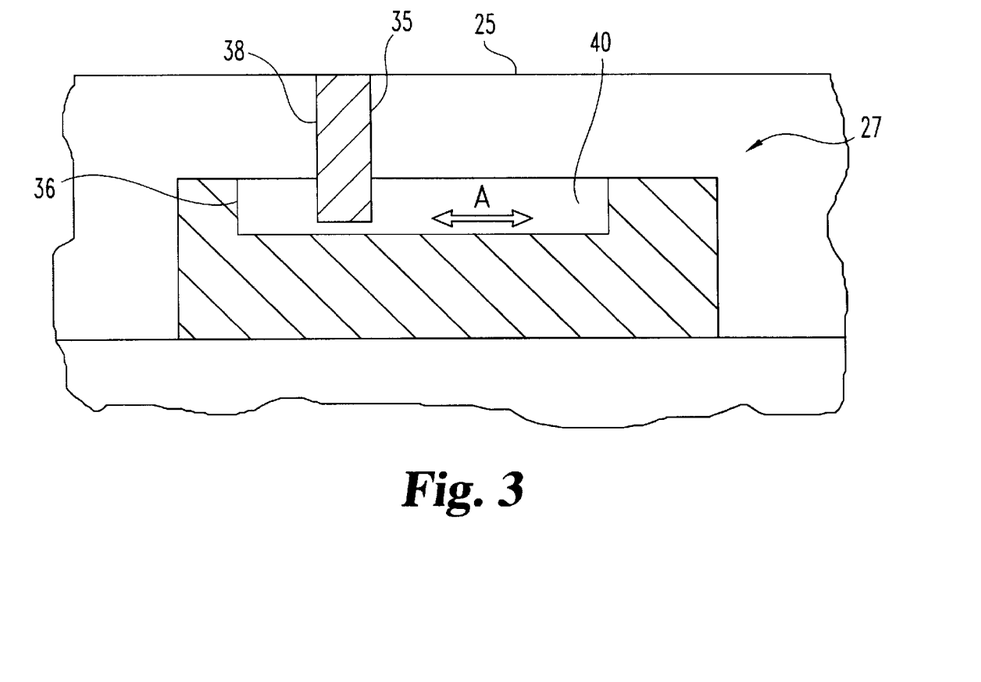
FIG. 3 is an enlarged view of a the inter-engaging pin member and elongated recess system comprising a portion of FIG. 2.
Figure 4:
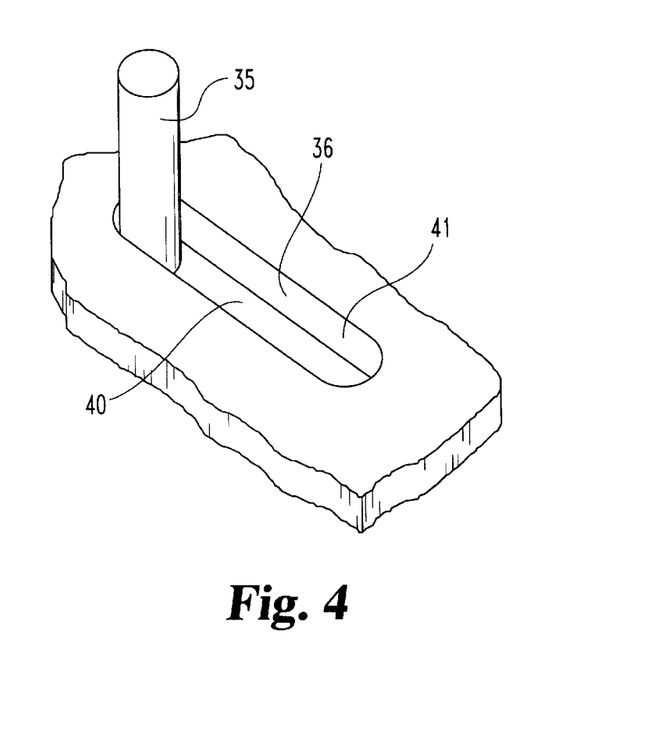
FIG. 4 is an illustrative view of the inter-engaging pin and elongated recess system of FIG. 3.

With reference to FIGS. 3 and 4, there are illustrated enlarged views of the inter-engaging extending portion 35 and receiving portion 36 which define a portion of the coupling device 27. The receiving portion 36 including a recess 40 formed in a surface of the gas turbine engine 19. As discussed above, in a preferred embodiment the recess 40 is formed in a boss portion 51 of a collar 50, and more preferably there are a pair of spaced elongated recesses formed one hundred and eighty degrees apart on the collar. The extending portion 35 is received with the recess 40 and is moveable relative to the walls 41 defining the recess. In one embodiment the coupling device 27 constrains the motion of the extending portion 35 relative to the receiving portion 36. With reference to FIG. 3, there is illustrated that the extending portion 35 can move in a substantially linear fashion relative to the receiving portion 36 as indicated by arrows A. Further, in another embodiment, the extending portion 35 is pivotal within the receiving portion 36 to allow other directions of motion. In one embodiment of the exhaust mounting system the coupling device 27 and the rear support 28 allow a substantially greater degree of movement of the exhaust system 25 in one direction than in the other directions.

Figure 5A:
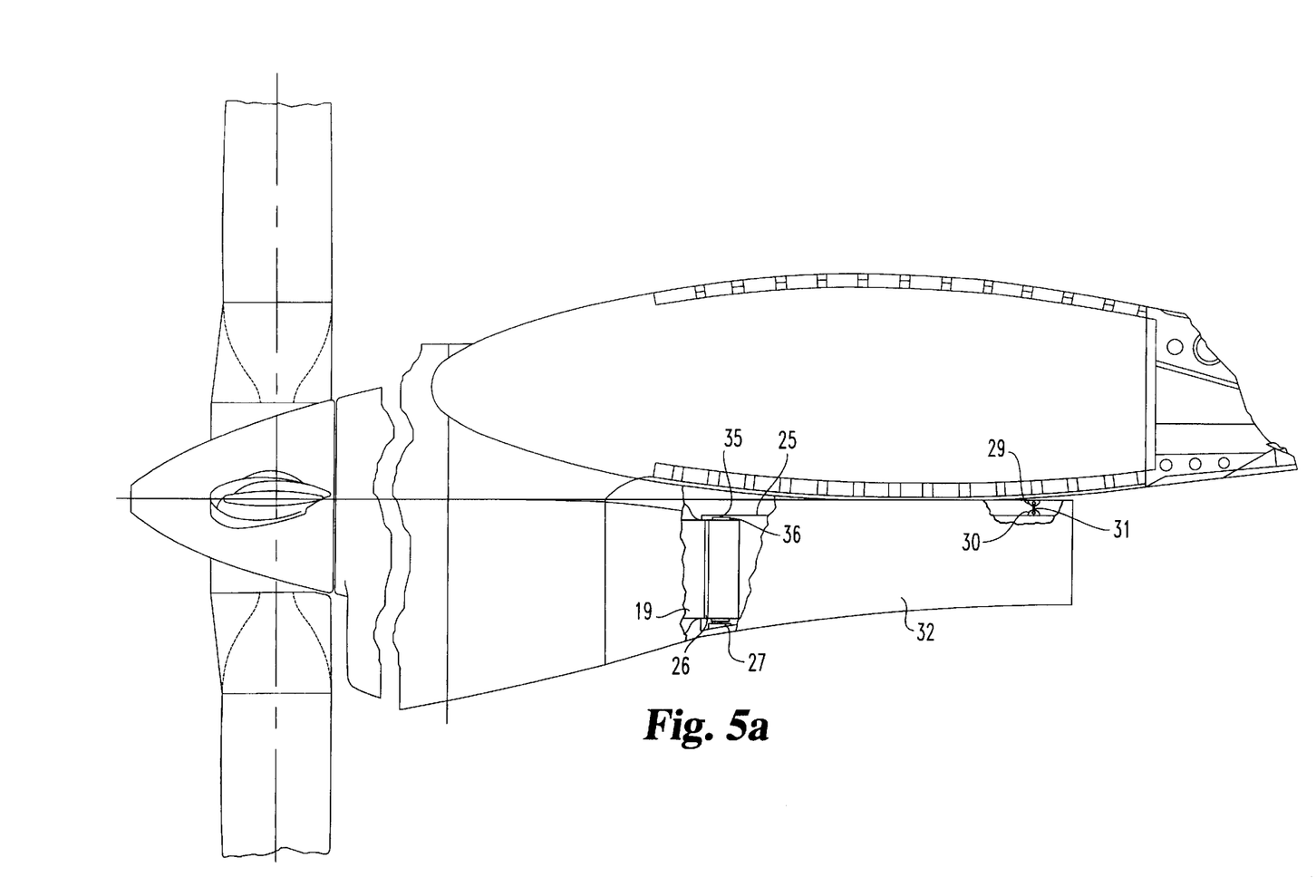
FIG. 5a is an enlarged partial view of FIG. 1 showing one embodiment of the coupling device of the present invention in a first position.
Figure 5B:
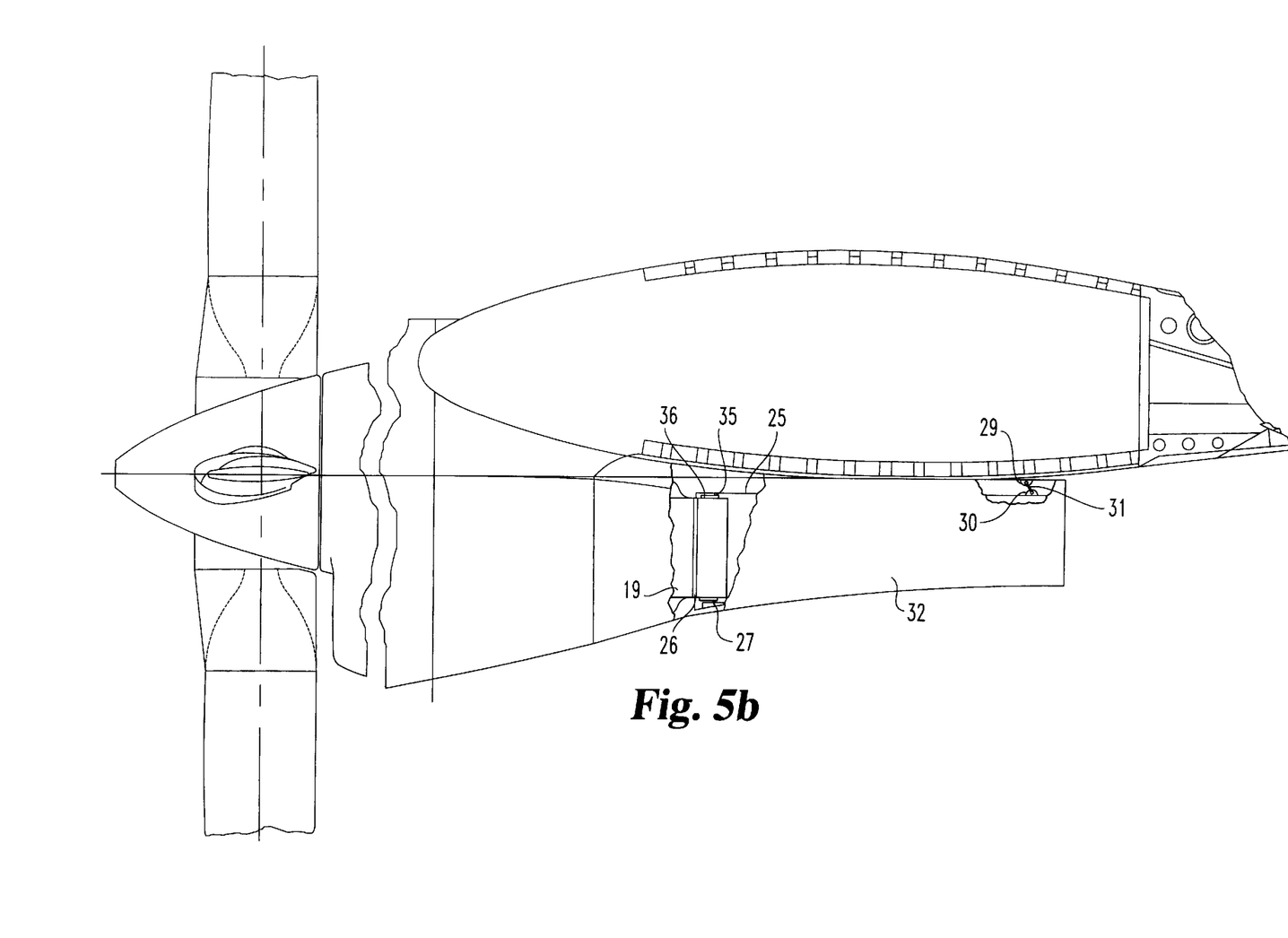
FIG. 5b is an enlarged partial view of FIG. 1 showing one embodiment of the coupling device of the present invention in a second position.
Figure 5C:
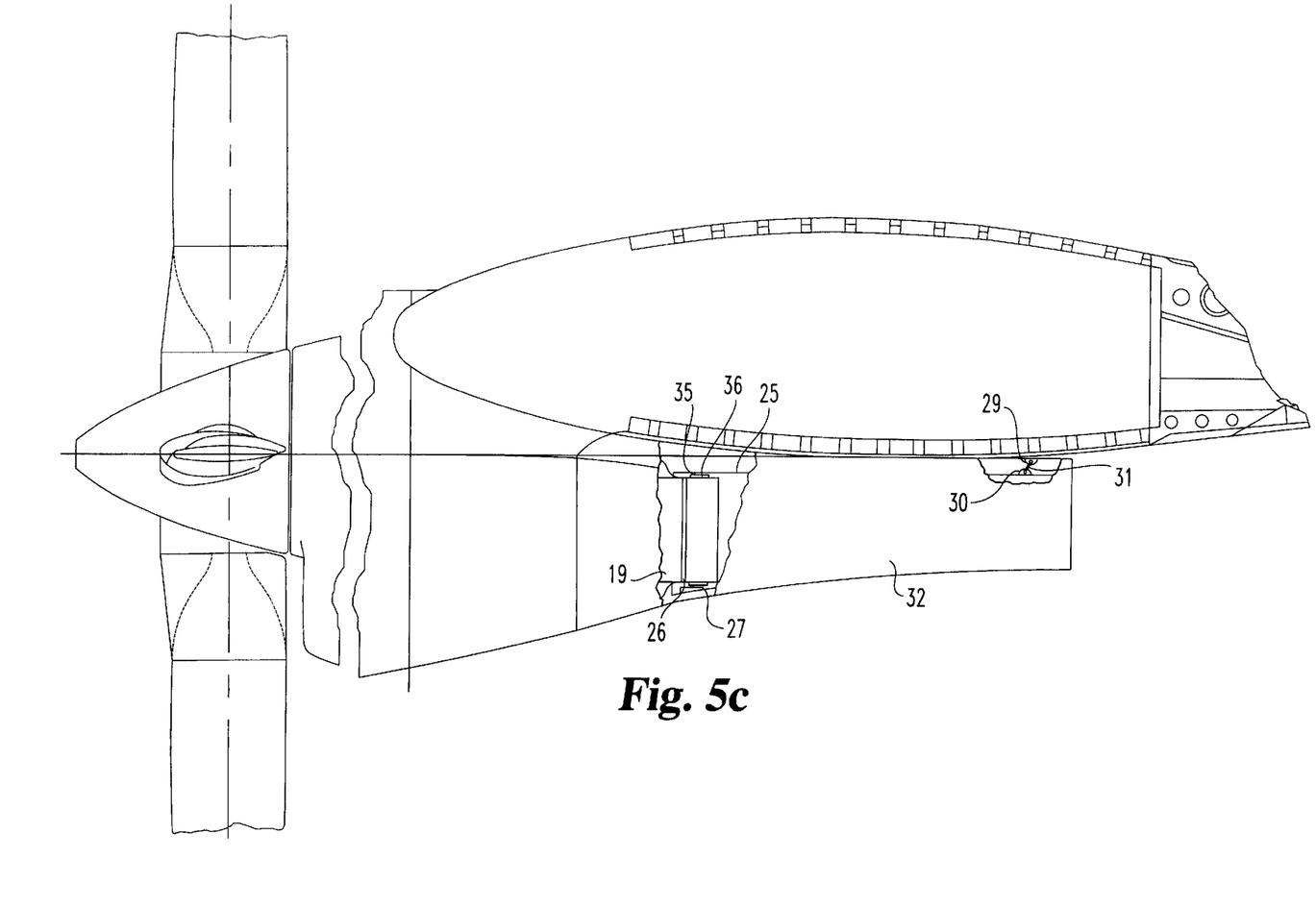
FIG. 5c is an enlarged partial view of FIG. 1 showing one embodiment of the coupling device of the present invention in a third position.

With reference to FIGS. 5a–5c, there is illustrated the exhaust system 25 as it has moved in relationship to the aircraft structure. The extending portion 35 moving relative to the receiving portion 36 and the mechanical link 31 in the rear support 28 has pivoted to accommodate the movement of the exhaust system 25. While the figures have only three distinct locations, it is understood herein that the coupling device 27 and the rear support will allow continuous movement between an upper and lower limit.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A combination, comprising:
   a gas turbine engine having an exit adapted for the passage of an exhaust gas;
   an exhaust member in fluid communication with said exit and adapted for receiving the exhaust gas from said exit; and a coupling system located substantially within a portion of said exhaust member and connecting said exhaust member with said gas turbine engine, said coupling system has an extending portion extending from and fastened to one of said exhaust member and said gas turbine engine and a receiving portion on the other of said exhaust member and said gas turbine engine for receiving said extending portion therein and allowing relative movement between said portions.

2. The combination of claim 1, wherein:

said coupling system includes a collar member connected with said gas turbine engine proximate said exit;

wherein said receiving portion is defined on said collar; and wherein said receiving portion defines at least one elongated recess.

3. The combination of claim 2 wherein said extending portion defines at least one pin, and wherein the movement of each of said at least one pin is constrained by a wall member defining said receiving portion.

4. A combination, comprising:

an aircraft;

a gas turbine engine coupled to said aircraft; said gas turbine engine having an outlet for the passage of exhaust gas;

an exhaust member in fluid communication with said outlet and adapted for receiving at least a portion of the exhaust gas from said outlet; and a coupling connecting said exhaust member with said gas turbine engine, said coupling having a first portion extending from and fastened to one of said exhaust member and said gas turbine engine and a second receiving portion on the other of said exhaust member and said gas turbine engine for receiving said first portion therein and allowing relative movement between said portions, wherein said coupling is positioned substantially within said exhaust member.

5. The combination of claim 4, which further includes a supporting member coupled between said exhaust member and said aircraft for supporting said other end of said exhaust member.

6. The combination of claim 5, wherein said coupling allows substantially linear movement between said portions.

7. The combination of claim 6, wherein said second receiving portion is on said gas turbine engine.

8. The combination of claim 7, which:

further includes a collar connected with said gas turbine engine proximate said outlet;

wherein said second receiving portion is on said collar; and wherein said second receiving portion defines at least one elongated recess.

9. The combination of claim 8, wherein said at least one elongated recess defines a pair of elongated recesses on said collar, and wherein said first portion defines a pair of members extending from said exhaust member, and wherein one of said pair of members extending into one of said pair of recesses and the other of said pair of members extending into the other of said pair of recesses.

10. The combination of claim 9, wherein each of said pair of elongated recesses define a pair of slots, and wherein each of said pair of members define a pin, and further wherein the movement of each of said pair of pins is constrained by a wall of said pair of slots.

11. The combination of claim 9, wherein one of said pair of slots is located at a top portion of said gas turbine engine and the other of said pair of slots is located at a bottom portion of said engine.

12. The combination of claim 6, wherein said outlet has a centerline and wherein said second receiving portion defines at least one slot substantially parallel with said centerline.

13. The combustion of claim 5, wherein said supporting member is swivelable and constrains the movement of said exhaust member.

14. The combination of claim 4:

which further includes a support member coupled between said exhaust member and said aircraft for supporting said other end of said exhaust;

wherein said exhaust member has an inner surface;

wherein said first portion defines a pair of members extending from said inner surface and located within said exhaust member;

wherein said second receiving portion defines a pair of elongated recesses associated with said gas turbine engine; and wherein each of said pair of elongated recesses has one of said pair of members positioned therein.

15. The combination of claim 14:

wherein said support member is pivotable to allow motion relative to said aircraft;

which further includes an inner collar mounted to said gas turbine engine, and wherein said pair of recesses are formed on said inner collar; and said outlet has a longitudinal axis and said pair of recesses are substantially parallel with said axis.

16. The combination of claim 4, wherein said coupling allows substantially greater motion between said first portion and said second portion in one direction than in any other direction.

17. A combination, comprising:

an aircraft having a gas turbine engine coupled thereto, said gas turbine engine having an outlet adapted for the passage of an exhaust gas;

an exhaust system in fluid communication with said outlet and adapted for receiving the exhaust gas from said outlet, said exhaust system having an inlet end and an other end;

a support member extending between said exhaust system and said aircraft, said support member bearing a portion of the weight of said exhaust system; and coupling means for connecting said inlet end of the exhaust system with said gas turbine engine.

18. The combination of claim 17, wherein said coupling means has a first portion connected to an inner surface of said exhaust member and a second portion associated with said gas turbine, and wherein said first portion is received within said second portion.

19. The combination of claim 18, wherein said coupling means connecting said inlet end of the exhaust system with said gas turbine engine at two spaced locations, and wherein said support member is pivotable.

20. The combination of claim 19 which further includes a seal between said coupling means and the inner surface of the exhaust system for preventing leakage of exhaust gas from said inlet end.

21. A combination, comprising:

an aircraft;

a gas turbine engine coupled to said aircraft by a plurality of mounts, said plurality of mounts allows at least a portion of said gas turbine engine to move more than an insubstantial amount in one direction, said gas turbine engine having an outlet opening adapted for the passage of an exhaust gas;

an exhaust system having a first end and a second end positioned in fluid communication with said outlet opening and adapted for receiving at least a portion of the exhaust gas;

a mechanical support member coupled to said aircraft and said exhaust system for supporting at least a portion of the weight of said exhaust system, said support member spaced from said first end towards said second end; and a coupling device connecting said first end of said exhaust system with said gas turbine engine, said coupling having a pair of pins coupled to and located within said exhaust system and a pair of spaced elongated recesses coupled with a portion of said gas turbine, said pair of pins interengaging with said pair of elongated recesses to support said first end of the exhaust system and allow said exhaust system to move with said gas turbine engine.

22. The combination of claim 21, wherein said pins extend radially inward from an inner surface of said exhaust system, and said pair of elongated recesses constraining the movement of pins.

23. The combination of claim 22, wherein said pair of elongated recesses define a pair of slots formed in a surface of said gas turbine engine.

24. The combination of claim 23, which further includes a member mounted to said gas turbine engine, and wherein said pair of slots are formed in said member.

25. The combination of claim 21, wherein said coupling device is located within said exhaust system;

wherein said pair of pins move in a linear fashion within said pair of elongated recesses; and wherein said pair of elongated recesses are spaced 180° apart.

* * * * *